(12) United States Patent
Schiavone et al.

(10) Patent No.: US 7,571,214 B2
(45) Date of Patent: Aug. 4, 2009

(54) SYSTEM AND METHOD FOR CONTROLLING DISTRIBUTION OF NETWORK COMMUNICATIONS

(75) Inventors: Vincent J. Schiavone, Berwyn, PA (US); James H. Koenig, Philadelphia, PA (US); David I. Brussin, Berwyn, PA (US)

(73) Assignee: Symantec Corporation, Cupertino, CA (US)

( * ) Notice: Subject to any disclaimer, the term of this patent is extended or adjusted under 35 U.S.C. 154(b) by 0 days.

(21) Appl. No.: 11/863,567

(22) Filed: Sep. 28, 2007

(65) Prior Publication Data

US 2008/0016173 A1 Jan. 17, 2008

Related U.S. Application Data

(62) Division of application No. 10/084,038, filed on Feb. 26, 2002, now Pat. No. 7,415,504.

(60) Provisional application No. 60/271,521, filed on Feb. 26, 2001.

(51) Int. Cl.
*G06F 15/16* (2006.01)

(52) U.S. Cl. ............... 709/207; 709/219; 709/224; 709/227; 709/203; 709/232; 370/230; 370/231; 370/232; 370/233; 370/237; 379/309

(58) Field of Classification Search ............... 709/207, 709/206, 227, 228, 229, 219, 224, 203, 232
See application file for complete search history.

(56) References Cited

U.S. PATENT DOCUMENTS

| | | | |
|---|---|---|---|
| 3,969,723 | A | 7/1976 | Kennicott |
| 4,558,413 | A | 12/1985 | Schmidt et al. |
| 4,714,992 | A | 12/1987 | Gladney et al. |
| 4,809,170 | A | 2/1989 | Leblang et al. |

(Continued)

FOREIGN PATENT DOCUMENTS

EP 0230616 A2 8/1987

(Continued)

OTHER PUBLICATIONS

U.S. Appl. No. 10/211,827, filed Aug. 2, 2002, Nachenberg.

(Continued)

*Primary Examiner*—Jude J Jean Gilles
(74) *Attorney, Agent, or Firm*—Fenwick & West, LLP

(57) ABSTRACT

A method for controlling distribution of network communications (messages). An incoming message either carries priority information, or is assigned priority information based on a shared characteristic with other messages. The priority information is used to determine how and/or when to deliver the message, e.g. by delaying the message for a fixed time. Preferences for receipt of messages by priority level may be communication to upstream hosts along a network path. Accordingly, an intermediary host may reject and/or delay messages that the intended recipient does not wish to receive. This pushes the burden of low-priority messages back to the sender, thereby reducing or eliminating burdens on network/system resources of the recipient and/or intermediaries between the recipient and the sender. Accordingly, it can "squelch" spam messages at or close to their source. Trusted senders complying with prescribed practices may include priority information allowing for delivery of their messages with higher priority.

5 Claims, 3 Drawing Sheets

U.S. PATENT DOCUMENTS

| | | | |
|---|---|---|---|
| 4,962,532 | A | 10/1990 | Kasiraj et al. |
| 5,155,847 | A | 10/1992 | Kirouac et al. |
| 5,182,806 | A | 1/1993 | McKeeman et al. |
| 5,204,960 | A | 4/1993 | Smith et al. |
| 5,377,354 | A | 12/1994 | Scannell et al. |
| 5,479,654 | A | 12/1995 | Squibb |
| 5,485,575 | A | 1/1996 | Chess et al. |
| 5,488,609 | A | 1/1996 | Hluchyj et al. |
| 5,495,610 | A | 2/1996 | Shing et al. |
| 5,508,817 | A | 4/1996 | Kunigami |
| 5,519,866 | A | 5/1996 | Lawrence et al. |
| 5,555,346 | A | 9/1996 | Gross et al. |
| 5,557,723 | A | 9/1996 | Holt et al. |
| 5,566,335 | A | 10/1996 | Nash et al. |
| 5,574,906 | A | 11/1996 | Morris |
| 5,581,764 | A | 12/1996 | Fitzgerald et al. |
| 5,613,108 | A | 3/1997 | Morikawa |
| 5,619,648 | A | 4/1997 | Canale et al. |
| 5,649,200 | A | 7/1997 | Leblang et al. |
| 5,671,398 | A | 9/1997 | Neubauer |
| 5,673,387 | A | 9/1997 | Chen et al. |
| 5,684,875 | A | 11/1997 | Ellenberger |
| 5,694,616 | A | 12/1997 | Johnson et al. |
| 5,699,275 | A | 12/1997 | Beasley et al. |
| 5,717,923 | A | 2/1998 | Dedrick |
| 5,729,743 | A | 3/1998 | Squibb |
| 5,774,552 | A | 6/1998 | Grimmer |
| 5,781,901 | A | 7/1998 | Kuzma |
| 5,790,856 | A | 8/1998 | Lillich |
| 5,794,210 | A | 8/1998 | Goldhaber et al. |
| 5,799,189 | A | 8/1998 | Koser et al. |
| 5,832,220 | A | 11/1998 | Johnson et al. |
| 5,883,946 | A | 3/1999 | Beck et al. |
| 5,892,900 | A | 4/1999 | Ginter et al. |
| 5,893,113 | A | 4/1999 | McGrath et al. |
| 5,903,880 | A | 5/1999 | Biffar |
| 5,905,896 | A | 5/1999 | Delannoy |
| 5,909,581 | A | 6/1999 | Park |
| 5,911,048 | A | 6/1999 | Graf |
| 5,917,489 | A | 6/1999 | Thurlow et al. |
| 5,933,647 | A | 8/1999 | Aronberg et al. |
| 5,933,811 | A | 8/1999 | Angles et al. |
| 5,948,058 | A | 9/1999 | Kudoh et al. |
| 5,948,104 | A | 9/1999 | Gluck et al. |
| 5,953,532 | A | 9/1999 | Lochbaum |
| 5,960,204 | A | 9/1999 | Yinger et al. |
| 5,960,411 | A | 9/1999 | Hartman et al. |
| 5,974,033 | A | 10/1999 | Kamiya et al. |
| 5,999,967 | A | 12/1999 | Sundsted |
| 6,006,034 | A | 12/1999 | Heath et al. |
| 6,006,242 | A | 12/1999 | Poole et al. |
| 6,035,423 | A | 3/2000 | Hodges et al. |
| 6,052,531 | A | 4/2000 | Waldin, Jr. et al. |
| 6,057,841 | A | 5/2000 | Thurlow et al. |
| 6,073,142 | A | 6/2000 | Geiger et al. |
| 6,081,814 | A | 6/2000 | Mangat et al. |
| 6,088,803 | A | 7/2000 | Tso et al. |
| 6,091,947 | A * | 7/2000 | Sumner ............... 455/413 |
| 6,092,080 | A | 7/2000 | Gustman |
| 6,119,165 | A | 9/2000 | Li et al. |
| 6,134,658 | A | 10/2000 | Multerer et al. |
| 6,138,146 | A | 10/2000 | Moon et al. |
| 6,145,079 | A | 11/2000 | Mitty et al. |
| 6,146,026 | A | 11/2000 | Ushiku |
| 6,147,977 | A | 11/2000 | Thro et al. |
| 6,151,643 | A | 11/2000 | Cheng et al. |
| 6,161,130 | A | 12/2000 | Horvitz et al. |
| 6,161,181 | A | 12/2000 | Haynes, III et al. |
| 6,163,807 | A | 12/2000 | Hodgkinson et al. |
| 6,178,551 | B1 | 1/2001 | Sana et al. |
| 6,185,603 | B1 | 2/2001 | Henderson et al. |
| 6,199,081 | B1 | 3/2001 | Meyerzon et al. |
| 6,260,059 | B1 | 7/2001 | Ueno et al. |
| 6,278,709 | B1 | 8/2001 | Walker et al. |
| 6,317,789 | B1 | 11/2001 | Rakavy et al. |
| 6,334,140 | B1 | 12/2001 | Kawamata |
| 6,345,256 | B1 | 2/2002 | Milsted et al. |
| 6,349,407 | B1 | 2/2002 | Towfiq |
| 6,363,415 | B1 | 3/2002 | Finney et al. |
| 6,374,237 | B1 | 4/2002 | Reese |
| 6,418,555 | B2 | 7/2002 | Mohammed |
| 6,421,669 | B1 | 7/2002 | Gilmour et al. |
| 6,442,593 | B1 | 8/2002 | Wang et al. |
| 6,460,036 | B1 | 10/2002 | Herz |
| 6,460,050 | B1 | 10/2002 | Pace et al. |
| 6,484,315 | B1 | 11/2002 | Ziese |
| 6,490,587 | B2 | 12/2002 | Easty et al. |
| 6,493,722 | B1 | 12/2002 | Daleen et al. |
| 6,510,552 | B1 | 1/2003 | Benayoun et al. |
| 6,535,894 | B1 | 3/2003 | Schmidt et al. |
| 6,609,196 | B1 | 8/2003 | Dickinson, III et al. |
| 6,643,258 | B1 | 11/2003 | Ise et al. |
| 6,651,249 | B2 | 11/2003 | Waldin et al. |
| 6,654,787 | B1 | 11/2003 | Aronson et al. |
| 6,771,765 | B1 | 8/2004 | Crowther et al. |
| 6,941,304 | B2 | 9/2005 | Gainey et al. |
| 7,050,445 | B1 | 5/2006 | Zellner et al. |
| 7,065,042 | B1 | 6/2006 | Pan et al. |
| 7,146,402 | B2 * | 12/2006 | Kucherawy ............... 709/206 |
| 7,194,681 | B1 | 3/2007 | Horvitz |
| 7,340,529 | B1 | 3/2008 | Yazaki et al. |
| 7,349,979 | B1 | 3/2008 | Cieslak et al. |
| 7,437,428 | B1 * | 10/2008 | Muti et al. ............... 709/219 |
| 2001/0018739 | A1 | 8/2001 | Anderson et al. |
| 2001/0039579 | A1 | 11/2001 | Trcka et al. |
| 2002/0007400 | A1 | 1/2002 | Pedersen |
| 2002/0112057 | A1 | 8/2002 | Srinivas et al. |
| 2002/0120705 | A1 | 8/2002 | Schiavone et al. |
| 2004/0133776 | A1 | 7/2004 | Putzolu |

FOREIGN PATENT DOCUMENTS

| | | |
|---|---|---|
| EP | 0735474 A2 | 10/1996 |
| EP | 0774720 A2 | 5/1997 |
| WO | WO 96/32679 A1 | 10/1996 |
| WO | WO 99/22325 A1 | 5/1999 |
| WO | WO 00/29945 A1 | 5/2000 |
| WO | WO 01/37123 | 5/2001 |

OTHER PUBLICATIONS

Ambriola, V. et al., "The Evolution Configuration Management and Version Control," Software Engineering Journal, Nov. 1990, Retrieved from IEEE database, Sep. 24, 2002, pp. 303-310, U.S.A.

Bellare et al., "Incremental Cryptography and Application to Virus Protection," ACM, 1995, pp. 45-56, Retrieved May 10, 2006, New York, N.Y.

CAUCE.org web pages [Online] Coalition Against Unsolicited Commercial Email [Retrieved on Mar. 17, 2003] Retrieved from the Internet<URL:http://www.cauce.org/about/problem.shtml>.

Conradi, R. et al., "Configuring Versioned Software Products," Department of CS and Telematics, Norwegian Institute of Technology, Trondheim, Norway, 1996, retrieved from http://citeseer.nj.nec.com/conradi96 on Sep. 24, 2002.

Cranor, F. et al., "Communications of the ACM," Aug. 1998, pp. 74-83, vol. 41, No. 8.

"Description of Windows 2000 Windows File Protection Feature (Q222193)," [Online], First published May 26, 1999, last modified Jan. 12, 2002, [Retrieved on Apr. 9, 2002] Retrieved from the Internet<URL:http://support.microsoft.com/default.aspx?scid=kb:EN-US;q222193>.

"Gold Parser, A Free Multi-Platform Parser Generator," [Online], devincook.com, [Retrieved on Oct. 7, 2003] Retrieved from the Internet<URL:http://www.devincook.com/goldparser/index.htm>.

Grundy et al., "Support for Collaborative, Integrated Software Development," Proc. 95 Software Engineering Environments, Abstract Only, Apr. 1995, U.S.A.

Hedin, G., "Incremental Execution in a Programming Environment Based on Compilation," Proc. of Nineteenth Hawaii Intl. Conf. on System Sciences, Abstract Only, Jan. 1986, U.S.A.

Hurwitz Group, "Application Management for Distributed Applications," Jun. 1998, pp. 1-7, U.S.A.

ISP-Planet Staff, Slower Spam Would Annoy Spammers [Online] Feb. 20, 2003, [Retrieved from the Internet on Apr. 22, 2005]. Retrieved from the Internet: <URL:ISP-Planet-Equipment-Slower Spam Would Annoy Spammers, http://www.isp-planet.com/equipment/2003/spamsquelcher.html>.

Jee et al., "A Generic Virus Detection Agent on the Internet," IEEE, 1997, pp. 210-219, Retrieved May 10, 2006, Taiwan.

Keneipp, R., "Traffic Shaping" [Online], May 14, 2001, [Retrieved from the Internet on Apr. 27, 2004] Retrieved from the Internet:<URL:Itworld.com-supersite manager—Traffic Shaping http://www.itworld.com/nl/sup_mgr/05142001/>.

Lindsay, P. et al., "A Generic Model for Fine Grained Configuration Management Including Version Control and Traceability," 1997 IEEE, Retrieved from the IEEE database Sep. 24, 2002, U.S.A.

MacNamara, J.E., "Technical Aspects of Data Communication," $2^{nd}$ Ed., 1982, Digital Equipment Corporation, pp. 110-122, U.S.A.

Marimba, "Castanet 3.0 Product Family," Jun. 1998, U.S.A.

Marimba, "Castanet Infrastructure Suite," Jun. 1998, U.S.A.

Marimba, "Castanet Management Suite," Jun. 1988, U.S.A.

Marimba, "Castanet Production Suite," Jun. 1998, U.S.A.

Morar, J.E. et al., "Can Cryptography Prevent Computer Viruses?" Virus Bulletin Conference 2000, Sep. 2000, pp. 127-138, Virus Bulletin Ltd., Oxfordshire, England.

"News Release—Symantec Delivers Cutting-Edge Anti-Virus Technology with Striker32," Oct. 1, 1999, 2 pages [Online], Retrieved on Nov. 11, 2003, Retrieved from the Internet<URL:http://www.symantec.com/press/1999/n991001.html> Author unknown.

Ore, O., "Number Theory and Its History," 1976, pp. 124-129, Gudron Ore, U.S.A.

Pocket Soft, "RTPatch® Professional for Windows, NT, and DOS Binary Update System," Jun. 23, 1998, pp. 1-6, http://www.pocketsoft.com\whtwind.html, U.S.A.

Pollock, L. "Incremental Version of Iterative Data Flow Analysis," IEEE Trans. Software Eng., Abstract Only, Dec. 1989, vol. 15, No. 12, U.S.A.

PR Newswire, "Spam Squelcher Technology Cuts Costly Impact of Spam on Enterprises and ISPs," New Product from ePrivacy Group turns back Spam Attacks with False Positives, [Online] Feb. 11, 2003, [Retrieved from the Internet on May 3, 2004]. Retrieved from the Internet:<URL: PR Newswire Spam Squelcher Technology Cuts Costly Impact of Spam on Enterprises and ISPs http://www.findarticles.com/cf_dls/m4prn/2003_Feb_11/97463210/p1/article.jhtml>.

Reichenberger, C., "Orthogonal Version Management," Universitat Linz, Institute for Informatik, Austria, 1989 ACM.

"RFC 2821—Simple Mail Transport Protocol," Klensin, J., editor, Apr. 2001, [Online] Faqs.org, [Retrieved on Oct. 13, 2003] Retrieved from the Internet<URL:http://www.faqs.org/rfcs/rfc2821.html>.

"Software: Windows ME; Windows ME and System File Protection," [Online], Last updated Mar. 11, 2002, [Retrieved on Apr. 9, 2002] Retrieved from the Internet:<URL:http://www.wackyb.co.nz/mesfp.html>.

Suk Oh, A. et al., "An Incremental Update Propagation Scheme for a Cooperative Transaction Model," Proc. $7^{th}$ Intl. Workshop on Database and Expert Systems Appl., Abstract Only, Sep. 1996, U.S.A.

"System File Protection and Windows ME," [Online] Dec. 4, 2001, [Retrieved on Apr. 9, 2002] Retrieved from the Internet:<URL:http://www.Microsoft.com/hwdev/archive/sfp/winME_sfpP.asp>.

"User-Friendly Interface for Applying Specific Levels of Coordinated Updates to Software in the Field," IBM Technical Disclosure Bulletin, Mar. 1989, vol. 31, No. 10, Armonk, NY, USA.

Wagner, M., "Tool Users Network Analysis to Fight Spam" [Online], [Retrieved from the Internet on Apr. 22, 2005] Retrieved from the Internet: <URL:Internet Week>E -mail>Tool Uses Network Analysis to Fight Spam> Feb. 13, 2003, http://www.internetweek.com/story/showarticle.jhtml?articleID=6900032>.

Wikipedia.org web pages [Online], Wikipedia, [Retrieved on Mar. 17, 2003] Retrieved from the Internet:<URL:http://www.wikipedia.org/w/wiki.phintl?title=machine learning and printable=yes>.

* cited by examiner

SYSTEM AND METHOD FOR CONTROLLING DISTRIBUTION OF NETWORK COMMUNICATIONS

RELATED APPLICATIONS

This application is a division of Ser. No. 10/084,038, filed on Feb. 26, 2002, which in turn claims the benefit of U.S. Provisional Patent Application No. 60/271,521, filed Feb. 26, 2001, which applications are incorporated herein by reference.

FIELD OF THE INVENTION

The present invention relates generally to the field of electronic mail messaging, and in particular to a system and method for controlling distribution of electronic mail messages to reduce the burden of bulk electronic mail messages, often referred to as "spam," on recipient and intermediate messaging systems.

BACKGROUND

Electronic mail messaging via computerized communications networks is widespread. Current mail servers have no way to ensure Quality of Service ("QoS") and/or Class (e.g. priority treatment) of electronic mail ("e-mail") processing, since they have no way to request or require limitations on the volume of different types of e-mail message traffic. For example, QoS problems often arise in the context of spam attacks—i.e. large mass mailings of unsolicited commercial e-mail messages. A common method for sending spam is the "dictionary attack." When this method is used, a marketer uses a list of common usernames, connects to a mail server, and then attempts to send a message to every username at the connected mail server. The method is then repeated for a next mail server. For example, john@ is a common username. The marketer might connect to anydomain.com's mail server and attempt to send e-mail to john@anydomain.com, even if the marketer doesn't know for sure whether such an e-mail account exists. If it does exist, the account (and a recipient) will receive the e-mail message. Another common method for sending spam is the "brute force" method in which various alphanumeric combinations are tried for selected domains, whether the addresses are known to be valid or not. This creates a particularly heavy burden on communications network resources. The method is often repeated for multiple mail domains to obtain a list of valid e-mail addresses that may sold or used for marketing purposes.

As a result, irresponsible senders of e-mail messages may, at will, undesirably burden messaging systems, e.g. by using network bandwidth, mail server and other messaging system resources, by sending messages as they desire.

What is needed is system and method for controlling distribution of e-mail messages (or other network communications, collectively "e-mail" messages) that reduces the burden on network resources of recipients and intermediaries and/or allows for distribution of e-mail messages in a prioritized manner according to preferences. Prioritization and preferences allow a recipient or intermediary to define criteria and/or set preferences to regain control of the utilization of the recipient's or intermediary's system resources.

SUMMARY

The present invention allows recipients, ISPs, ESPs, and other network communication (message) recipients to control how their network's or systems resources, such as network connectivity bandwidth, are used and/or allocated for use to distribute messages from others. The present invention also allows for preferential prioritized treatment of compliant messages sent from trusted senders, and lower priority treatment of non-compliant messages from non-compliant and/or irresponsible senders. The present invention further provides for lessening or avoiding the impact of virus, spam, and denial of service attacks, and the ability to load balance incoming messages onto a cluster of servers.

The present invention provides flow prioritization and spam squelcher functionality whereby network communications (messages) either carry priority information, or are assigned priority information based on a shared characteristic with other messages. The priority information is used to determine how, when and/or whether to deliver or process the message, e.g. by delaying the message for a fixed time, routing to a junk folder, or deleting. Preferences for receipt of messages by priority level may be communication to upstream hosts along a network path. Accordingly, an intermediary host may reject, delay and/or delete messages that the intended recipient does not wish to receive, or the intermediary does not wish to process (e.g. messages carrying viruses, fraudulent messages, or spam messages). This pushes the burden of low-priority messages back to the sender, thereby reducing or eliminating burdens on network/system resources of the recipient and/or intermediaries between the recipient and the sender. Accordingly, it can "squelch" spam messages at or close to their source. Trusted senders complying with prescribed practices may include priority information allowing for delivery of their messages with higher priority.

Various hosts (ESP & ISP) along the message's path may prevent poorly-behaved hosts from monopolizing their message processing capability (bandwidth, CPU, storage, etc). The flow prioritization and spam squelcher functionalities create an infrastructure of well-behaved messaging hosts that respect the priority of messages and the capacity of other hosts. An added benefit of the present invention is the ability to "squelch," i.e. delay or block, spam (unsolicited bulk e-mail messages) close to its source. By squelching close to the source of the messages, a greater beneficial effect on overall network resources may be achieved because fewer subnetworks are burdened by the messages.

DETAILED DESCRIPTION

Figure 1:
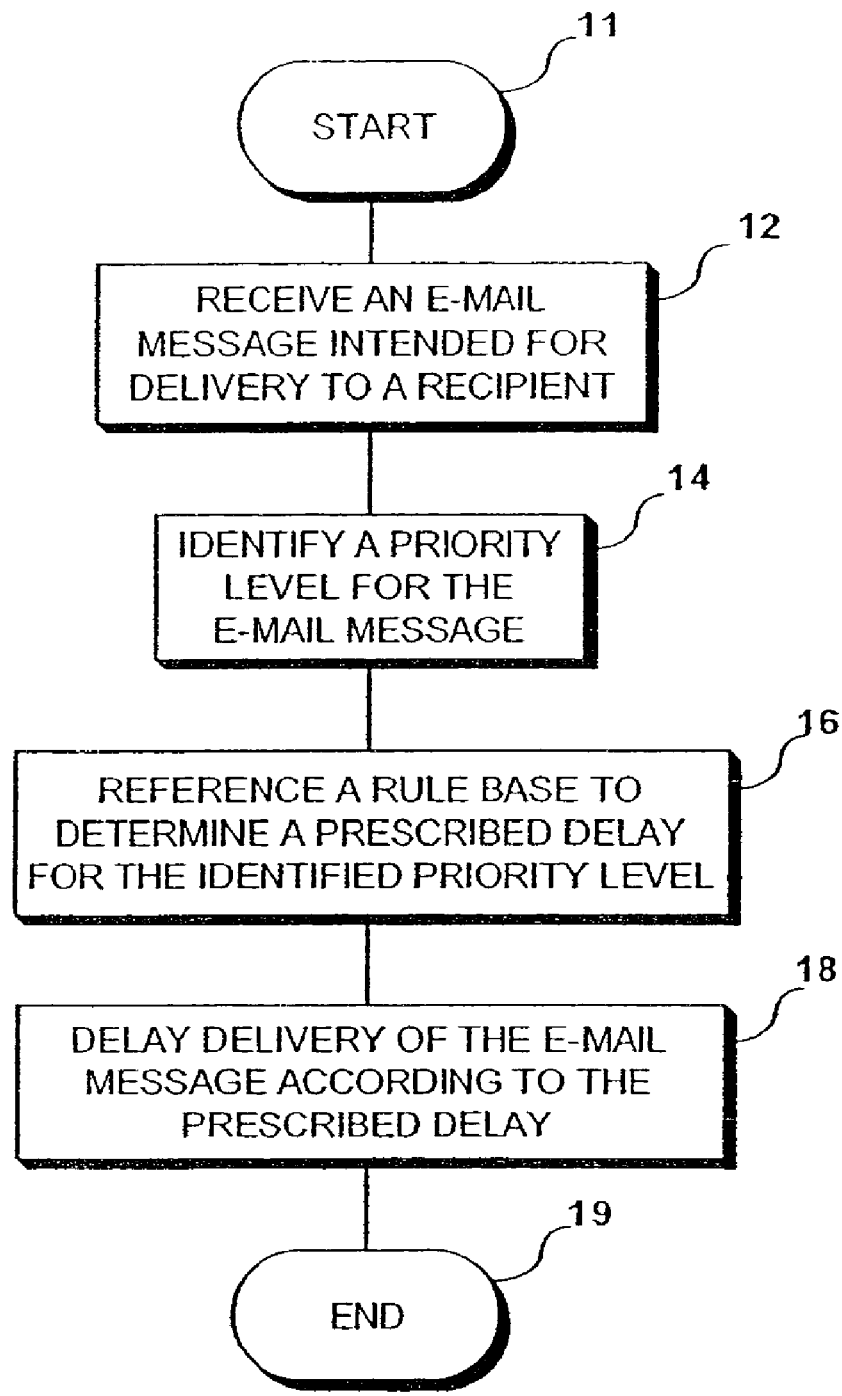
FIG. 1 is a flow diagram of an exemplary method for controlling distribution of e-mail messages according to the present invention.

Conceptually, the present invention controls distribution of network communications, e.g. e-mail messages (collectively, "e-mail messages"), in a prioritized manner or pursuant to an industry supported standard regarding specific classes of service, e.g. BUSINESS PRIORITY (IMMEDIATE DELIVERY, high cost) or PERSONAL PRIORITY (QUICK DELIVERY, moderate cost), etc. This is achieved by controlling the allocation of network connections for delivery of messages, e.g. to delay allocation of requested connections until load parameters are met, until higher priority messages are delivered, etc. For example, e-mail messages may be distributed according to recipient or intermediary preferences. Accordingly, from the recipients' perspective, higher priority messages appear to be delivered/received first. Recipients and intermediaries can prevent overburdening of their systems' network resources due to delivery of spam messages or other relatively unimportant e-mail, e.g. commercial e-mail, billing statements, personal e-mail messages, etc. This allows for higher priority processing of e-mail messages of relatively higher importance (or paid-for higher priority), e.g. business-related communications. For example, this prevents a high-priority business-related e-mail from being delayed due to a deluge of spam messages, and/or prevents high-priority business-related e-mail messages from getting "lost" among a list of spam messages in a user's mail client "inbox."

The inventive method may be implemented in software, e.g. by modifying mail server software, or by providing a hardware appliance along a network path between an e-mail sender and an e-mail recipient. The appliance may be located logically between external networks and internal messaging systems. Preferably, the network appliance receives all incoming and outgoing message connections. The network appliance acts similarly to a recipient mail server, firewall, proxy, router, switch and/or load balancer in that it allocates network connections. However, the network appliance uses additional logic, in accordance with the present invention, to allocate network connections in an order to achieve a prioritization effect in accordance with the present invention, e.g. by delaying allocation of a network connection for delivery of a low priority message and/or allocation a network connection for delivery of a relatively high priority message before a relatively low priority message. Additionally, allocation of the network connection may be delayed for a given path or priority to meet preference criteria, e.g. that a certain path, sender, priority, etc. message should not be delivered if utilization of network resources exceeds a predetermined threshold.

Preferably, senders, recipients and intermediaries, such as ISP or ESP servers, etc. are provided with software and/or hardware for carrying out the present invention. When the inventive method is used closer to the sender, relatively greater conservation of network resources can be achieved, as discussed below.

Figure 3:
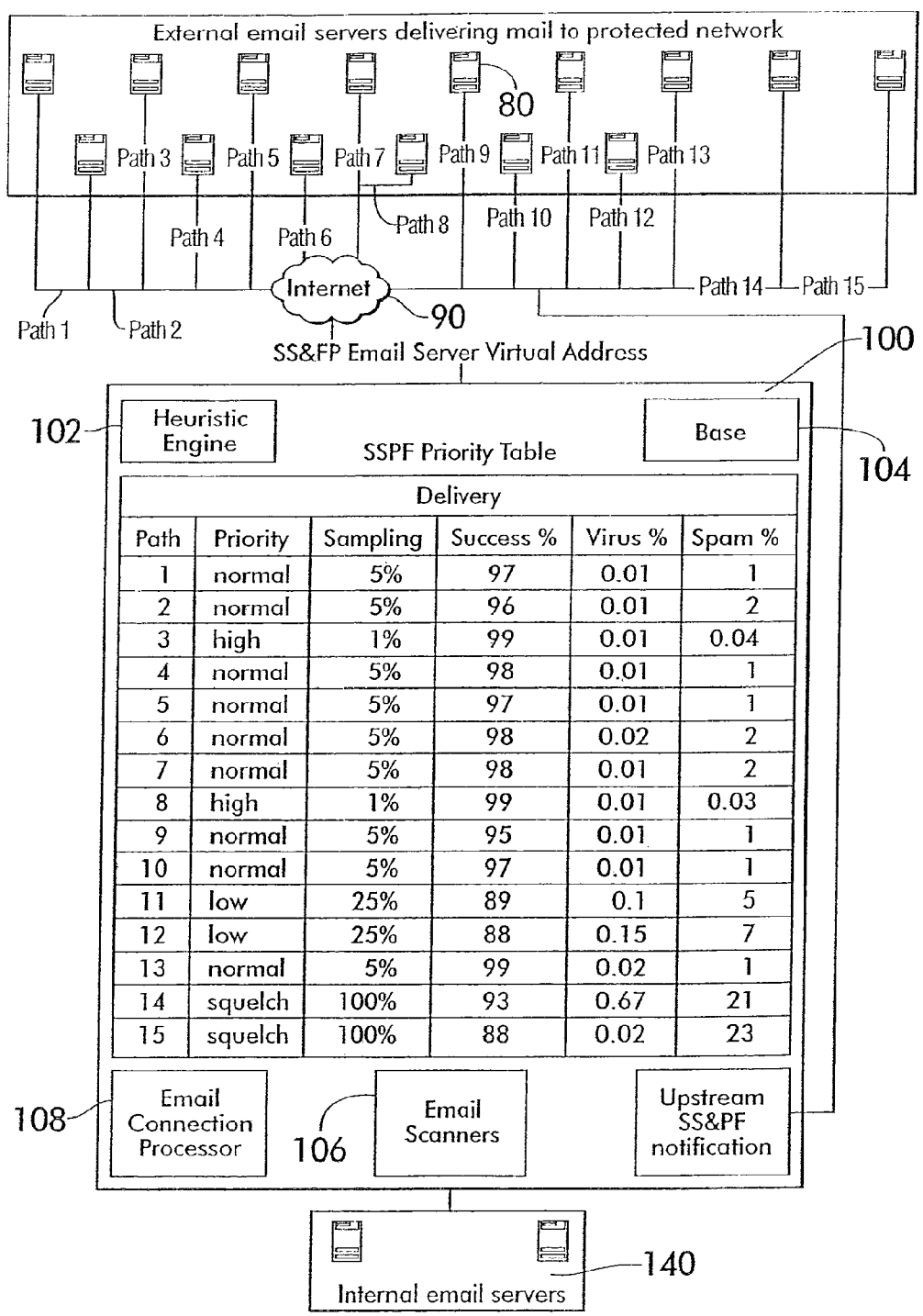
FIG. 3 is a block diagram of a system for controlling distribution of e-mail messages according to the present invention.

FIG. 1 is a flow diagram 10 of an exemplary method for controlling distribution of e-mail messages according to the present invention. In the example of FIG. 1, a network appliance 100 configured for carrying out the inventive method is provided between the communications network (e.g. Internet) and internal e-mail servers of an enterprise (e.g. a corporation), as shown in FIG. 3. This allows the enterprise to conserve the enterprise's network and/or system resources in accordance with the present invention.

As shown in FIG. 1, the method starts with receipt of an e-mail message intended for delivery at a recipient, as shown at step 11. It should be noted that this step may include a call for a network connection for delivery of an e-mail message. This step may be achieved by the network appliance 100 of FIG. 3. Consider an e-mail message intended to be delivered from a sender via the sender's e-mail server 80 via a communications network 90. In the prior art, the e-mail message is typically routed through to the intended recipient's internal e-mail server(s) 140. In accordance with the present invention, the network appliance 100 (or a process/modified mail server software, etc.) is provided in the communications path between the sender and the intended recipient so that the e-mail message is effectively intercepted by the network appliance 100 before being delivered to the intended internal e-mail server(s) 140. Accordingly, the e-mail message can be processed in accordance with the present invention before delivery to the recipient to conserve the enterprise's network resources.

A priority level for the incoming e-mail message is then identified, as shown at step 14 of FIG. 1. This may be performed in a variety of ways. In one embodiment, the e-mail messages are configured to carry priority information in accordance with the present invention. For example, such priority information may include a priority flag, such as "Immediate Action Required," "For Reference Only," "For Information Only," "Highest Priority," etc., or may include a categorization of the e-mail message, e.g. "Internal Business Communication," "External Business Communication," "Personal," "Friends and Family," "Bills and Statements," etc. It should be noted that higher priority treatment may be sold or purchased to senders as desired to obtain higher priority treatment of their messages. In one embodiment, the message may include a message-type specifier such as a keyword or a seal graphic/image object (indicating compliance with certain laws, regulations and/or best practices standards) contained in the viewable portion of the message, e.g., body, subject line, etc., of the message, that may be used as the priority information. Alternatively, the priority information may be a compiled header that is a datastring, such as an alphanumeric or ASCII character string, stored in a special field of the message's header information that includes information indicating a priority level, or information that may be used to determine a priority level. The compiled header may include encrypted or formatted data that may be understood by the network appliance, and preferably not by others. Such header information is typically hidden from the recipient. Provision of such header information, message specifiers and/or other priority information is disclosed in commonly assigned U.S. application Ser. No. 09/793,263, filed Feb. 26, 2001, U.S. application Ser. No. 09/793,296, filed Feb. 26, 2001 and U.S. application Ser. No. 09/792,936, filed Feb. 26, 2001, the disclosures of which are hereby incorporated herein by reference. The compiled header is generated by appropriate software and/or an appropriate appliance at the sender or an intermediary, such as an ISP or ESP. The header includes information indicating that it is a message that is compliant with the present invention and/or a certain standard associated with the present invention, e.g. identifying the sender of the message as a "trusted sender." This header is generated programmatically from the full header information contained generally in all e-mail messages (generated at the sender), e.g. at the same time by the same software or a component thereof.

This priority information, which is very compact in terms of additional data required, allows compliant e-mail hosts to ensure that message priority is taken into account in message processing and handling. The header may be built using such techniques as a binary bitmask, and be processed with negligible impact on throughput. The message handling can provide a priority scale, e.g. giving system compliant mail highest priority (or ranked priority, such as 'immediate response required,' fyi, etc), and noncompliant mail lower priority or other priority (e.g., for preferred customer, etc.). This priority information provides e-mail hosts the ability to process inbound message traffic based on priority schedules defined by a multitude of processes, including business logic, workflow processes, time-of-day, urgency and communication protocol requests.

Forgery of the compiled header would yield no benefit. Encrypted and/or digitally signed messages could also be processed by the receiving host. Legacy mailers not yet using this inventive technology may be prioritized using source address and path information when available. For example, ISP/ESP software and/or appliance processing compiled headers (i.e. Flow Prioritizer and Spam Squelcher) are processed based on a list (static or dynamic, local or remote) of preferred customers' e-mail domains.

Accordingly, in such an embodiment, senders are expected to make declarative statements about the e-mail, and are trusted to make accurate statements, e.g. that the mail is a "BUSINESS" type e-mail. In a sense, the sender is "trusted" to make accurate statements, and to respect the recipients' wishes that incoming messages include such accurate statements/information. For example, the sender may select a priority level from a menu of priority levels displayed on the sender's communication device via a graphical user interface in accordance with the present invention. This selection may then be used to associate a priority level with an outgoing message. Alternatively, unless otherwise indicated, all e-mail from a given sender or domain may be assigned a predetermined of default priority, and appropriate information may be incorporated in the outgoing message. Mail composition software must be modified using known techniques to provide for presentation of such a menu and/or automatic designation of such information. The "trusted sender's" privileges in terms of use of the necessary software may be revoked in the case of irresponsible use of such statements/information.

For incoming e-mail messages that do not carry priority information, e.g. do not include a specifier, compiled header information, etc., other information must be used to identify a priority level for the message in step 14. In such a case, other information typically carried by an e-mail message, or associated with an e-mail message, is used in an inventive way in accordance with the present invention to identify a priority level. For example, information that may be used includes a network address of a sending or intermediary (e.g. ISP) system, a sub-network of a sending or intermediary system, a domain name of a sending or intermediary system, or other network path information typically found in network communication headers, such as TCP/IP packet headers, or application path information such as network path information of systems previously processing and/or routing the message, sender identity domain or other information typically carried by an e-mail header (e.g., SMTP header information such as TO, FROM, SUBJECT, DATE, mail agent, "received" history, etc.), or other geographic origin (as determined by known techniques), source, origin, path or other information that may be shared by multiple messages and thereby provide identifying information by which future messages from the same geographic, source, origin, path, etc. may be prioritized, etc.

Any message not bearing the compiled header may be processed at a lower priority than a message with such a compiled header, thereby providing the prioritization functionality of the present invention.

Figure 2:
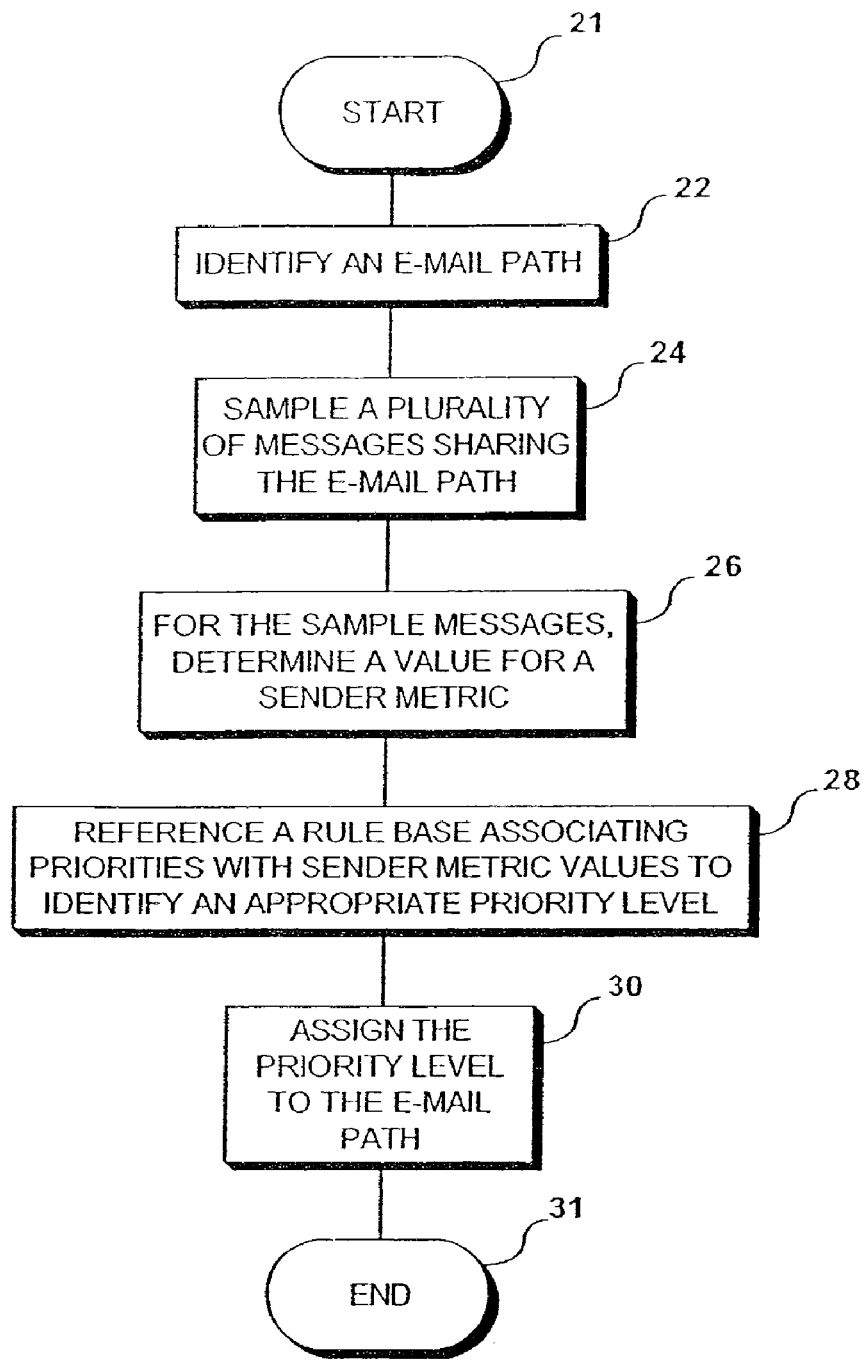
FIG. 2 is a flow diagram of an exemplary method for using a heuristic approach to identifying a priority level for an e-mail path according to the present invention.

FIG. 2 is a flow diagram 20 of an exemplary method for using a heuristic approach for identifying a priority level for an e-mail message's network path according to the present invention. Accordingly, the method of FIG. 2 may be used as part of step 14 of FIG. 1 when an e-mail message does not carry priority information. Conceptually, the method of FIG. 2 identifies characteristic information that may be shared by multiple messages and performs a statistical analysis on those messages to determine which messages are likely to be from irresponsible senders or be undesirable, etc., and then assigns all messages having that shared characteristic information a corresponding priority level. Accordingly, messages having a shared characteristic are assigned a priority level based on some metric or other shared information. For example, messages delivered from a certain sender along a certain network path may be sample to determine levels of messages containing viruses, to determine whether the messages are undeliverable (which is often the case when a dictionary attack spam method is used), or whether the messages are spam, e.g. as determined by pattern matching or other known techniques for detecting abusive messages.

Referring now to FIG. 2, the exemplary method starts with identification of an incoming e-mail message's network path, as shown at steps 21 and 22. For example, such information may be ascertained by referring to TCP/IP packet headers. This is performed by the network appliance 100 of FIG. 3, specifically, by the heuristic engine 102. One or more pluralities of messages sharing a network path are then sampled, as shown at step 24. For example, the sampling rate of messages may be predetermined and static, e.g. 5% of all messages received on the network path. For example, this may be established by the system, system administrator, or recipient. The sampling rate may be determined be reference to the rules engine 104 or another repository for storing system or recipient preferences.

In another embodiment, the sampling rate is dynamic and therefore changes over time. In such an embodiment, it may be desirable to sample at a default rate, and then to adjust the sampling rate. For example, consider that a recipient has determined that messages received along a certain network path are relatively unimportant to him and so should be delivered at a rate that consumes no more than a fixed percentage of available network resources. The recipient may specify a preference setting the percentage. Accordingly, when an analysis determines that messages are being received at a rate beginning to exceed the preferred percentage, the priority level of messages for that path may be decreased, and the sampling rate may be increased. Sampling at a rate inversely proportional to the determined priority of a given path allows more sampling/monitoring to be devoted to questionable senders or paths, etc. Alternatively, prioritization can be inferred by observing behavior of a recipient and prioritizing according to the observed preferences of the recipient.

For the sample messages, e.g. 5% of messages arriving along a certain network path, a value for a sender metric is determined, as shown at step 26. For example, sender metrics may include a delivery success rate metric indicating the percentage of messages that are delivered (or undeliverable). For example, this may be achieved by maintaining a hash table of valid addresses in order to determine deliverability of sampled messages, or by proxy processing of e-mail "bounce" messages by the network appliance. It should be noted that this table of processing may be performed dynamically, in real time. Methods and techniques for doing so is straightforward as will be appreciated by those skilled in the art. The rate of undeliverable messages is typically unusually high when the messages are sent using a dictionary attack or brute force spam method because many of the recipient addresses are merely guesses at valid network addresses. Alternatively, a spam rate metric may be determined to indicate the proportion of messages from a certain path that are deemed to be spam, and therefore undesirable. For example, messages may be determined to be spam using content-based analysis, such as pattern matching, as is well known in the art. While this technique may not be completely effective for filtering, it is useful for heuristic analysis. As another alternative, a virus rate metric may be used to reflect the number of messages along a given network path that carry viruses, e.g. using virus-checking software. Any suitable metric and/or value may be used. The sampled messages are scanned by the e-mail scanners 106 of the network appliance 100 (FIG. 3), and suitable software for implementing the e-mail scanners is well-known in the art, or requires straightforward modification of software well-known in the art.

Once a value for a given path is determined, a rule base 104 is referenced, as shown at step 28. The rule base 104 stores recipient, system, etc. preferences and rules for delivering e-mail messages. For example, the rule base 104 may store a rule indicating that a network path having a delivery success rate of less than 80% shall be assigned a "LOWEST" priority level.

Finally, the method ends when the priority level specified in the rule base for the metric having a certain value is assigned the associated priority level specified in the rule base, as shown at steps 30 and 31. For example, the network path having a delivery success rate of less than 80% is assigned the "LOWEST" priority level. For example, this may involve storing data associating the network path with the "LOWEST" priority level so that data may be accessed and used by the network appliance 100, namely the e-mail connection processor 108, for the delivery of e-mail messages in a prioritized manner, as discussed below.

Accordingly, the priority level determined for the network path as discussed with reference to FIG. 2 may be identified as the priority level to the incoming e-mail message arriving along that network path in step 14 of FIG. 1.

Referring again to FIG. 1, the rule base 104 is next referenced to determine a prescribed delay for the identified priority level. More generally, the rule base may specify any kind of delivery instructions for the identified priority level. For example, the rule base may store rules indicating that messages with a "HIGHEST" priority level are to be delivered directly to the recipient's mail server 140 without any unnecessary delay. For example, this may be performed without regard to network resource availability or load. Alternatively, a rule may specify that messages with a "LOWEST" priority be delayed, e.g. by holding the message for a fixed period of time, or until network resource availability reaches a certain level, etc. Similar rules may apply to any message characteristic, e.g. "BUSINESS." By delaying delivery, more network/system resources are available for distribution of higher priority messages, and distribution of the lower priority message will not likely use network resources that are need to deliver higher priority messages. By not delivering the message at the desired time, or by rejecting the message altogether and not delivering the message, the burden may be shifted from the recipient's network resources to the senders (or an intermediary's) network resources, which then must resend the message. The technique of delaying the message in fact delays the entire connection, so no recipient mail server resources are used until that connection is processed. The benefit is realized over time as the total number/volume of connections from a certain path is contained to desired levels through the cumulative delay in processing of individual connections. An application of this concept is the balancing of paths in terms of a percentage of total available resources. This delaying or rejecting of network connections provides a mechanism for controlling the total number of connections for a particular message source or path.

In one embodiment, any connection refusal is not reported back to the originator as "host not available" or some other message that makes the recipient's ISP seem technically in error (e.g., system is down). Due to the workings of SMTP (mail protocol), the slowing and/or temporary stopping of connections will not be reported for a predetermined time period, typically four hours.

Delaying of messages, or blocking of messages, because of the low priority can effectively "squelch" spam or other undesirable messages. This squelching effectively eliminates or softens the undesirable "noise" of unwanted or relatively unimportant e-mail messages, allowing the relatively more important messages to be distributed sooner, and apart from the deluge of undesired e-mail.

The delaying and/or eventual delivery of messages is performed by the e-mail connection processor 108 of the network appliance, as shown in FIG. 3. The connection processor 108 receives incoming connections for delivery of e-mail messages and calls other components of the network appliance 100 as necessary. The connection processor 108 also creates network connections as necessary to delivery e-mail messages at the appropriate time, e.g. after the prescribed delay, to delivery messages in accordance with the prioritization techniques described herein. The connection processor may be implemented with software using network architecture layer 4 and/or layer 7 switching and/or load balancing techniques that are well known in the art. Modification of such techniques to provide for delayed delivery, etc. in accordance with the present invention is straightforward, as will be appreciated by those skilled in the art.

Accordingly, when an incoming message is received, by the network appliance 100 (or by software for implementing the functionality of the network appliance, e.g. in the form of modified mail server software) the message either carries priority information, or is assigned priority information based on a shared characteristic with other e-mails, such as the message's network path. The priority information is used to determine how and/or when to deliver the e-mail message. For example, the message may be delayed for a fixed time, or until network/system resource utilization drops to a certain level, etc. or as otherwise prescribed. In this manner, for example, a recipient may choose to have low priority spam messages held for delivery until after his network resource utilization drops to a desired level, or until after all higher priority messages have been delivered, etc. This reduces the burden on the recipient's network/system resources.

It should be noted that intermediaries, such as ISP's, routing nodes, gateways, etc., between the recipient and the sender may also have network appliances 100 (or similar software) for carrying out the inventive method. This provides advantages similar to those described above for recipients, except that the recipient may also benefit from the intermediary's delay, etc. in sending of lower priority messages.

In addition, in such embodiments, the network appliances may be provided with notification ability for broadcasting preferences to another party. For example, the network appliance of a recipient may be provided with an upstream notification module 110, and an intermediary ISP may be provided with a network appliance configured to receive messages from the upstream notification module 110. Accordingly, when the network appliance 100 at the recipient determines to hold messages from a certain network path, etc., the upstream notification module 110 notifies an intermediary, such as the recipient's ISP, of this preference. The recipient's preference may then be stored in the intermediary's rule base. Accordingly, the intermediary may begin rejecting, or delaying, messages that the recipient does not wish to receive. This may be repeated by the intermediary for another upstream intermediary closer to the sender. Repeating of this process can eventually push the burden of low-priority messages back to the sender, thereby reducing or eliminating burdens on network/system resources of the recipient and all intermediaries between the recipient and the sender. This is particularly useful to push the burden of spam messages back to the systems of the spam senders. This can create a spam "squelch" at the source of the spam messages, thereby reducing burdens on multiple communications networks and systems.

It should be noted that such notifications may be broadcasted to any other party, not just upstream parties. Accordingly, information from one party, e.g. ISP, may be shared with another party, e.g. another ISP. For example, this information sharing allows the second ISP to lower priority of messages arriving along a certain network path before any such messages are received by using information learned by the first ISP that messages received along that certain network path are undesirable, or should be treated with a lower priority, e.g. because of an irresponsible sender. This is advantageous for conserving ISP network resources. In effect, this allows for creation of a list of "blacklisted" senders, communication paths, etc. that may be shared with other parties that have network appliances and operate in accordance with the present invention.

When any compliant e-mail host is faced with an overburdening of its network or system resources, e.g. by a volume of message exceeding its processing capability, e.g., as determined when CPU utilization and/or disk and/or network parameters surpass acceptable levels, the system can broadcast or post a request that sending hosts reduce the e-mail message traffic volume by sending a message upstream to compliant systems.

The upstream message will be passed back along the e-mail delivery network path until it reaches the sender or until it reaches a poorly-behaved email host. E-mail hosts ignoring priority, volume and squelch messages are considered poorly behaved because they do not respect the capacity of downstream servers.

If such a request is ignored by a poorly-behaved email host (as evidenced by no change in e-mail traffic volume), the inventive system initiates a Spam Squelch by limiting the number and volume of connections, minimally at a network level, from the offending host. For example, the network appliance tracks volume/number of inbound connections per host, and slow and/or stop the TCP and/or SMTP connection build process for squelched hosts. Additionally, when a source path is identified, e.g. for spam, it may be traced to an ISP of the spam sender. Accordingly, the ISP may be identified and pressured to demand compliance of the spam sender with a certain industry standard of best practices. The ISP may be held responsible for failure to obtain compliance of the spam sender by imposing a lower priority level to all messages receive via the ISP's communication path, thereby imposing a heavy burden on the ISP.

FIG. 3 is a block diagram of a system 200 for controlling distribution of e-mail messages according to the present invention. As discussed above, the senders, or more precisely the senders' e-mail servers, may be configured with software to provide compiled headers or other priority information as described above. For example, this functionality may be integrated into existing mail server software. Alternatively, a network appliance may be provided to appropriately modify an outgoing message after leaving the mail server but before it reaches the network. Recipients, or more specifically recipients' mail servers, or mail clients, may be configured with software for carrying out the inventive method described above. Alternatively, a network appliance may be provided upstream of the recipients' mail servers, as shown in FIG. 3.

Intermediaries may also have modified mail software and/or network appliances for carrying out the present invention, as described above.

This present invention also provides the capability to track and report the last known path for spam messages. Specifically, squelch events (i.e., poorly behaved hosts) and excessive volume may be tied to manually and/or automatically detected (using existing and inventive techniques). In some embodiments, spam messages are transmitted to a central host for logging. This aids in the identification of spam sources, which can be identified by IP address, network path, hosting ISP, etc.

Accordingly, the present invention allows the ISPs/ESPs and other email hosts are able to control the volume of messages to within their network's/systems' processing capability, and still respect the priority of compliant e-mail messages. Furthermore, the content of email messages is not of concern to the ISPs/ESPs, so longstanding arguments by the ISP community regarding their role as telecommunications infrastructure (with respect to Communications Decency Act (CDA), COPPA, etc) will not be threatened by their inspection of e-mail message content. In this manner, ISPs maintain their lack of responsibility for content on the grounds that they do not inspect content in any way, but rather merely deliver communications traffic. Accordingly, the present invention provides for spam reduction without the need for such content inspection.

In a system in which hosts are required to have a digital certificate from a designated authority, and digital signatures are required for various communications, poorly behaved hosts may have their digital certificates revoked, e.g., when a sender violates a service agreement, to ensure compliance. A system may be implemented that is programmed to automatically file unsigned messages in a special mailbox.

In systems in which e-mail messages are processed by rules, it is advantageous to digitally sign the rules in the header of each message. For example, an SMTP proxy may be advantageously configured so that all outgoing e-mail messages are automatically signed using a private key that is specially registered to a sender (e.g. a marketer). Each e-mail message must be individually signed because each message is different, since e-mail messages tend to have "unsubscribe" links at their bottom. This provides the advantage of guarding against accidental or malicious modification of the rules. It also verifies to the recipient that the e-mail were in fact deals offered by the sender of the email.

What is claimed is:

1. A method for controlling distribution of network communications via a communications network, the method comprising:
    tracking a number of inbound connections for each of a plurality of communications hosts;
    sending, responsive to a certain communications host accounting for a number of inbound connections exceeding a certain percentage of available connections, a request to the certain communications host to reduce its network communications;
    monitoring a volume of network communications from the certain communications host; and
    altering, responsive to the certain communications host failing to reduce a volume of its network communications, a connection build process for the certain communications host to control a flow of the certain communications host's network communications.

2. The method of claim 1, wherein the connection build process relates to a TCP connection.

3. The method of claim 1, wherein the connection build process relates to an SMTP connection.

4. The method of claim 1, wherein the connection build process comprises slowing the connection build process for said certain host.

5. The method of claim 1, wherein altering the connection build process comprises stopping the connection build process for said certain host.

* * * * *

UNITED STATES PATENT AND TRADEMARK OFFICE
CERTIFICATE OF CORRECTION

| | | |
|---|---|---|
| PATENT NO. | : 7,571,214 B2 | Page 1 of 1 |
| APPLICATION NO. | : 11/863567 | |
| DATED | : August 4, 2009 | |
| INVENTOR(S) | : Vincent J. Schiavone, James H. Koenig and David I. Brussin | |

It is certified that error appears in the above-identified patent and that said Letters Patent is hereby corrected as shown below:

Column 11, Line 3, after "wherein" please insert -- altering --.

Signed and Sealed this

Seventeenth Day of November, 2009

David J. Kappos
*Director of the United States Patent and Trademark Office*